Feb. 21, 1933.  W. A. CHRYST  1,898,339
DOUBLE ACTING SHOCK ABSORBER
Filed May 21, 1928
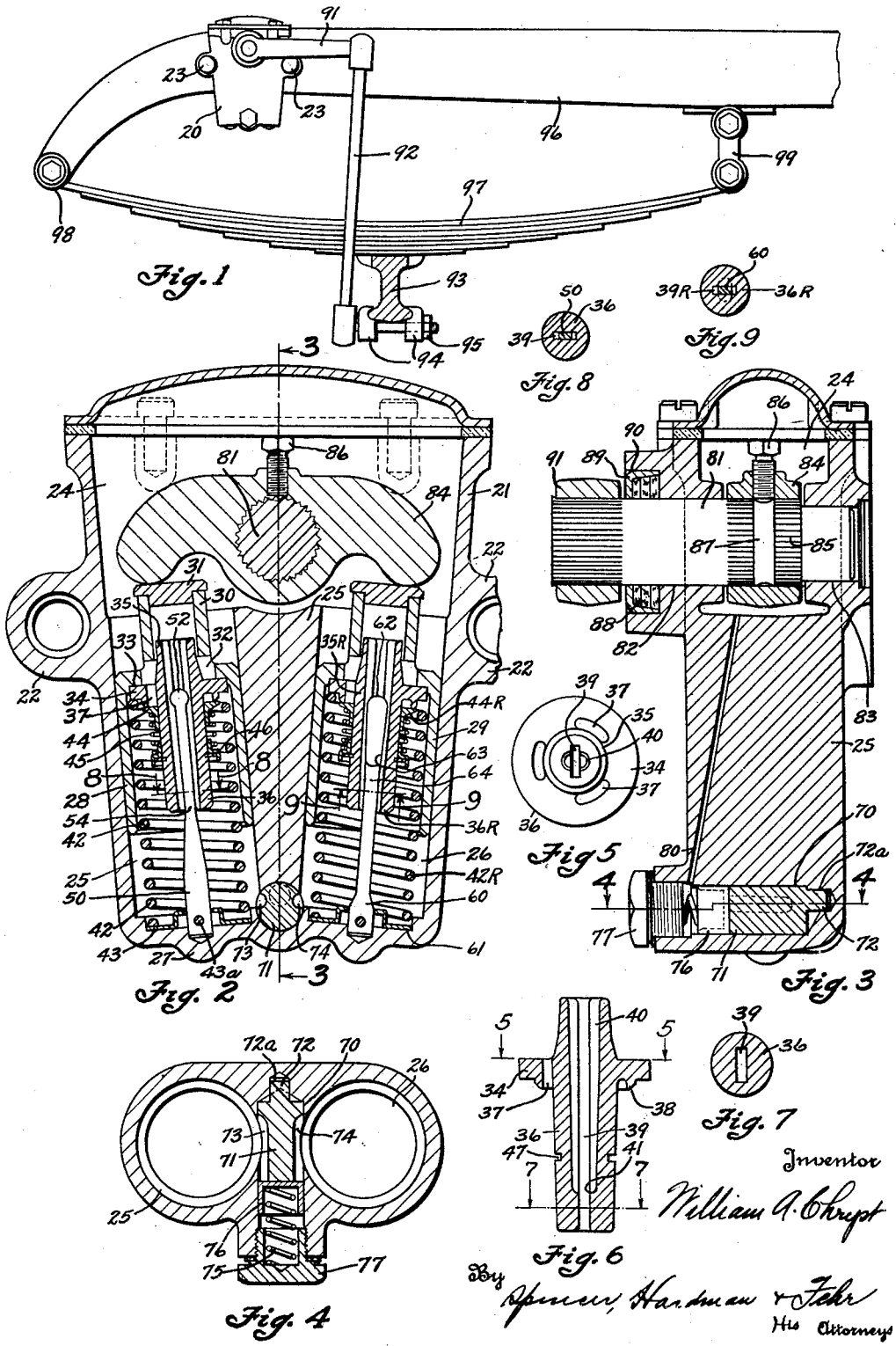

Patented Feb. 21, 1933

1,898,339

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

DOUBLE ACTING SHOCK ABSORBER

Application filed May 21, 1928. Serial No. 279,372.

This invention relates to improvements in shock absorbers for cushioning the movement of two relatively movable members, for example, a frame and axle of a vehicle.

One object of the present invention is to provide a shock absorber of simple and compact construction for resisting both the approaching and separating movements of the frame and axle of a vehicle and thus dissipating road shocks and preventing their transmission to the vehicle frame.

Further objects and advantages of the present invention will be apparent from the following description, reference being had to the accompanying drawing, wherein a preferred embodiment of one form of the present invention is clearly shown.

In the drawing:

Fig. 1 illustrates a front portion of the frame of an automotive vehicle supported by a spring upon the usual axle, the shock absorber embodying the present invention being shown applied thereto.

Fig. 2 is a cross sectional view taken longitudinally through the shock absorber.

Fig. 3 is a view taken along the line 3—3 of Fig. 2, certain portions, however, being shown in elevation for the sake of clearness.

Fig. 4 is a transverse section taken along the line 4—4 of Fig. 3.

Fig. 5 is a view taken along the line 5—5 of Fig. 6.

Fig. 6 is a longitudinal section, at enlarged scale, of the valve seat member.

Fig. 7 is a section taken along the line 7—7 of Fig. 6.

Fig. 8 is a fragmentary section taken along the line 8—8 of Fig. 2.

Fig. 9 is a view similar to Fig. 8 taken along the line 9—9 of Fig. 2.

Referring to the drawing, the shock absorber 20 comprises a casing 21 having apertured lugs 22 adapted to receive studs 23 for securing the casing to the vehicle frame. The casing 21 presents a fluid chamber 24. Within the fluid chamber 24 there is provided a partition 25 which cooperates with the walls of casing 21 to form left and right cylinders 25 and 26 respectively. As shown in Fig. 2 of the drawing, the axes of these cylinders converge, being closer together at the bottom of the cylinder than at the top. The casing wall 27 closes the bottom of the cylinders, as shown in Fig. 2. In the left cylinder 25 there is provided a piston 28, and in the right cylinder 26 a piston 29. Inasmuch as both of these pistons are constructed substantially alike, the left piston 28 only will be described. A cylindrical extension 30 is formed on the head of piston 28, the open end of said cylindrical extension 30 receiving a hardened head button 31, which completely closes this end of the extension 30. Apertures 32 formed in the head of the piston provide communication between the space beneath the piston and the fluid chamber 24 above the piston. On the inside surface of the piston head is formed an annular recess 33 adapted to receive the flange portion 34 of the valve seat member 35.

Referring particularly to Figs. 2, 5 and 6, the valve seat member 35 is shown comprising a hollow body portion 36, the flange 34 being formed on said hollow body portion between the ends thereof and in closer proximity to the one end than to the other. Spaced passages 37 are provided in the flange 34 substantially adjacent the outer surface of the body portion 36. On the bottom side of said flange portion 34 there is provided an annular ridge 38 which surrounds the passages 37. The upper portion of the body 36 above the flange 34 is tapered so as to extend into the cylindrical extension 30 of the piston head and provide a space between the inner wall of said cylindrical portion 30 and the outside wall of the body portion 36. The valve seat member 35 has a longitudinal central passage 39 shown in the Fig. 5 as being rectangular in shape, two of the side walls being substantially wider than the other two walls. In the two wider side walls of this passage 39 longitudinal grooves 40 are provided which extend from the top of the member 35 downwardly to a point 41 adjacent the bottom end of the said member. Thus, above the point 41, passage 39 comprises the rectangular portion and the additional side passages formed by grooves 40, while below the point 41 the passage 39 is simply rectangular and of the size illustrated in Fig. 5. The flange 34 of the valve seat member 35 fits into and is maintained in engagement with the annular recess 33 in the piston head by a spring 42, one end of which surrounds the annular ridge 38 and engages the flange 34, the other end resting upon and holding a retaining collar 43 in a recess formed in the bottom of the cylinder 25. The spring 42 tends to move the piston 28 toward the open end of the cylinder 25 under certain conditions, as will be explained hereinafter. A valve 44 is slidably supported upon the body portion 36 of the valve seat member 35, said valve being maintained in engagement with the outer edge of the annular ridge 38 by a coil spring 45, one end of which engages the valve 44, the other end resting upon an abutment collar 46 held immovably upon the body portion 36 by a C-washer, which fits into the groove 47 provided in the outer surface of the body portion 36. The valve structure is the means for establishing a free flow of fluid from the fluid chamber 24 through the passages 32 and 37, into the cylinder 25 in response to the movement of the piston 28 toward the open end of the cylinder 25.

The means for establishing a restricted flow of fluid from the cylinder 25 to the fluid chamber 24 will now be described. Extending into the interior of the hollow body portion 36 of the valve seat member 35, is a metering pin 50, made of sheet material the thickness of which is slightly less than the width of the narrower side of passage 39. One end of the pin 50 is hingedly attached to the retaining collar 43 by a cross pin 43a. The bottom portion of the metering pin 50 is substantially of the same size as the rectangular portion of passage 39. From a point adjacent the bottom of the pin, the edges of the wider sides converge, tapering toward each other as they approach the point designated by the numeral 54. At this point the width of the pin is considerably less than the wider dimensions of the rectangular portion of the passage 39. From the point 54 the two sides of the pin extend upwardly substantially parallel, terminating in an enlarged head 52 the width of which is slightly less than the wider dimension of the rectangular portion of passage 39, thus the head 52 acts as a guide substantially holding the pin centrally of the passage 39.

When the piston 28 is positioned, as shown in Fig. 2, apertures of substantial size are provided between the edges of the metering pin 50 and the narrower walls of the rectangular portion of passage 39 beneath point 41. however, as the piston 28 is moved downwardly into the cylinder 25 and the body portion 36 moves over the widening tapered portion of the pin 50, these apertures are gradually reduced until the pin 50 will substantially close the passage 39 to fluid flow. It will, of course, be understood that upon reverse movement of the piston, that is, the movement of the piston 28 toward the open end of the cylinder 26, the body portion 36 in moving away from the tapered portion of the pin 50 will gradually increase the apertures between the edges of the pin and the narrower walls of the passage 39. The grooves 40 in the wider sides of passage 39 provide unrestricted fluid passageways above the actual metering end of the passage 39, said metering end, as stated, being substantially beneath the point 41 as regards Fig. 6.

In Fig. 2 piston 29 is provided with a metering pin 60 shaped reversely to the metering pin 50. Metering pin 60, like metering pin 50, has its bottom end hingedly anchored to a retaining collar 61, the other end of the metering pin having an enlarged head portion 62 similar to the head portion 52 of the metering pin 50, however, the edges 63 of this pin tapering from the head portion 62 toward each other until substantially at the point 64 from which point said side walls are substantially parallel. widening again near the bottom to provide for the hinged connection with collar 43. When the piston 29 is in normal position, as shown in Fig. 2, apertures between the pin and the narrower sides of the passage in member 36R are of comparatively larger size than when the piston is at its uppermost position, said apertures being gradually decreased as the piston rises in the cylinder.

As the piston 29 moves upwardly, the fluid flow from the fluid chamber will move the valve 44R from its valve seat, thus permitting fluid to flow freely from the fluid chamber 24 into the cylinder 26. In this upward movement, the metering portion of the body 36R will move over the widening portion of the pin 60 and thus decrease the fluid flow spaces between the said pin and the narrower walls of the passages 39R. Upon reverse movement of the piston 29 or upon the movement of the piston toward the closed end of the cylinder 26, the fluid in the cylinder beneath the piston will have pressure exerted thereon, the reduced metering apertures substantially restricting the flow of fluid from the cylinder to the fluid chamber as the fluid tries to escape through these apertures. This restriction will gradually be reduced as the piston moves downwardly over the pin 60, the metering portion of the body 36R moving away from the wider portion of the pin 60 toward the smaller portion, thus increasing the size of the fluid flow spaces.

From the above it may be seen that the metering pins 50 and 60, together with their corresponding fluid metering passage members 36 and 36R, restrict the flow of fluid from the respective cylinders 25 and 26 to the fluid chamber 24 in response to the downward movement of the respective pistons 28 and 29, that is their movement toward the end wall 27 of their respective cylinders. In one case, that is, in the case of piston 28, the restriction is gradually increased as said piston moves downwardly and in the other case, that is, the case of the piston 29, such restriction is gradually decreased as the piston approaches the bottom of its cylinder. However, in both cases, as the pistons move toward the open end of their cylinders a free flow of fluid through the pistons will be established due to the valves 44 and 44R being moved from their respective valve seats.

In the partition 25 adjacent the end wall 27 of the cylinder there is provided a transverse passage 70 for receiving a cylindrical plug 71. The end of the cylindrical plug 71 is provided with a lug portion 72 fitting into a recess 72a in the casing which communicates with the passage 70 thereby preventing rotative movement of the plug relative to the casing. On opposite sides of the plug 71 are provided longitudinal passages 73 and 74, said passages starting at the outer end of the plug and terminating adjacent the inner end thereof so that the outer ends of said passages are open and the inner ends are closed. Passage 73 is substantially tangential to and communicates with cylinder 25 and passage 74 is tangential to and communicates with cylinder 26. In passage 70 there is slidably supported a valve 76 normally held against the end of plug 71, so as to close the ends of passages 73 and 74. A spring 75 interposed between the valve 76 and the nut 77, which is screw-threaded into the casing, yieldably maintains the valve 76 in engagement with the end of the plug. If, at any time, the pressure upon the fluid in either cylinder exceeds a predetermined value, it will force the valve 76 away from the plug 71, against the effect of spring 75, and thus provide a transverse passage between passages 74 and 73 forming communication between cylinders 26 and 25, so that the cylinder having the excessive pressure may be relieved by exhausting fluid through the passage provided by valve 76 to the adjacent cylinder. It will, of course, be understood that adjustments of the nut 77 or changes of spring 75 may vary the pressure required to move valve 76 to provide the communicating passage between the two cylinders 25 and 26. A channel 80 leads from the space between valve 76 and nut 77 to the fluid chamber 24 so that, if fluid accumulates behind valve 76, it will not present an incompressible medium behind said valve, but when valve 76 is moved away from plug 71, the fluid behind said valve will be forced through the channel 80 back into the fluid chamber 24. A rock shaft 81 is journalled in bearing portions 82 and 83 of the casing, the rocker arm 84 being secured to a splined portion 85 of the rock shaft 81 by a set screw 86, which extends into an annular groove 87 formed in the rock shaft 81. The splines 85 prevent rotative motion between the rock shaft and rocker arm 81 and 84 respectively, while the screw 86, engaging the annular groove 87, prevents longitudinal movement between the rock shaft and arm. A packing gland comprising fibrous washers 88 and a retainer collar 89 are provided about the rock shaft 81 in the recess 90. The rock shaft 81 has one end extending outside the casing 21, to which is secured the shock absorber operating arm 91, the free end of the operating arm 90 having a rigid connecting link 92 secured thereto. Connecting link 92 is also attached to the vehicle axle 93 by means of a clamp 94 held on said axle by a clamping nut 95. As shown in Fig. 1 the shock absorber is attached to the frame 96 of the vehicle by means of bolts or studs 23. The frame 95 is supported on the axle 93 by springs 97, one of which is shown in the Fig. 1, the one end of spring is hingedly attached to the frame as at 98, the other end to the shackle 99, also is hingedly attached to the frame 95.

When the road wheels of the vehicle strike an obstruction in the roadway, spring 97 is flexed toward the frame 96, this movement of the spring and more particularly axle 93 toward the frame 96 will cause link 92 to rotate arm 91 in a counter-clockwise direction, which likewise rotates shaft 81. The aforementioned movement of the shaft causes the rocker arm 84 to be rotated in a counter-clockwise direction, the left end of the arm engaging the piston head button 31 and moving the piston downwardly into its cylinder, thus exerting a pressure upon the fluid therein, said fluid in turn escaping through the passage 39 in body portion 36 of the valve seat member 35, past the metering pin 50. The restriction to the flow of fluid will counteract the downward movement of piston, thus the movement of spring 97 toward the frame 96 will be impeded. As has been mentioned heretofore, continued movement of the piston downwardly will gradually increase the restriction to the fluid flow through the hollow body portion 36 due to the approach of said hollow body portion over the widening portion of the pin 50, and, consequently such restriction to the flow of fluid from the cylinder 25 to the fluid chamber 24 is gradually increased in accordance with the movement of said piston downwardly.

As piston 28 moves downwardly, the spring 42R will move piston 29 upwardly following the movement of the right end of the rocker arm 84. This movement of the piston 29 will cause the fluid in the fluid chamber 24 to move valve 44R from its seat and thus a free flow of fluid from the fluid chamber 24 to the cylinder 26 is established. As soon as the spring 97 has reached its limit of deflection, caused by the road wheels striking the obstruction in the roadway, the said spring will return to its normal position, that is, it will move away from the frame 96 and consequently the axle will move the link 92 to rotate the shock absorber arm 91 in a clockwise direction. This movement of the arm 91 rotates arm 92 in a clockwise direction, thus rocker arm 84 will be moved clockwise causing piston 29 to be pushed downwardly into its cylinder and piston 28 to be moved upwardly in its cylinder. The downward movement of piston 29 compresses the fluid in the cylinder chamber beneath it and the fluid will then escape through the hollow body portion 36R of the valve seat member 35R into the fluid chamber 24. Initially, the metering portion of the said hollow body portion 36R is adjacent the wider portion of the pin 60, thus small fluid flow spaces are provided which offer a substantially high restriction to the flow of fluid. The movement of the piston 29 downwardly is consequently substantially impeded. However, as the piston continues to move downwardly the metering end of the hollow body portion 36 will be moved toward the narrower end of the metering pin 60 and thus, the restriction to the flow of fluid from the cylinder to the fluid chamber 24 is gradually reduced, and consequently the impedance to the piston movement is comparatively reduced.

From this it may be seen that the return action of the spring 97 toward its normal position is retarded at a gradually decreasing rate, thus the separating movement between the spring 97 and the frame 96 is impeded and consequently the rebound is effectively checked.

Excessive pressures are relieved in each cylinder by the valve 76, as has been described, so that danger of any parts breaking, due to excessive pressures, is substantially eliminated.

The present device, therefore, effectively counteracts sudden approaching and separating movements of the spring 97 and the frame 96, thereby substantially reducing shocks, caused by the road wheels of the vehicle striking obstructions in the roadway, from being transmitted to the frame 96, which ordinarily supports the vehicle body.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid chamber and a pair of cylinders, a piston in each cylinder, means for operating said pistons, a valve in each piston for establishing a free flow of fluid from the fluid chamber into the respective cylinders in response to the movement of the respective pistons in the one direction, means for establishing a restricted flow of fluid from each cylinder to the fluid chamber in response to the movement of the respective pistons in the other direction, said means comprising a member carried by each piston and a cooperating member supported by the casing in each cylinder, and means controlled by fluid pressure to provide communication between the cylinders when said fluid pressure in either cylinder exceeds a certain value.

2. A shock absorber comprising in combination, a casing presenting a fluid chamber and a pair of cylinders, a piston in each cylinder, means for operating said pistons, a valve in each piston for establishing a free flow of fluid from the fluid chamber into the respective cylinders in response to the movement of the respective pistons in the one direction, means for establishing a restricted flow of fluid from each cylinder to the fluid chamber in response to the movement of the respective pistons in the other direction, said means comprising a member carried by each piston and a cooperating member supported by the casing in each cylinder, and a common relief valve for both cylinders.

3. A shock absorber comprising in combination, a casing presenting a fluid chamber and a pair of cylinders, a piston in each cylinder, means for operating said pistons, means in each piston for establishing a free flow of fluid from the fluid chamber into the respective cylinders in response to the upward movement of said pistons, means in the one cylinder for establishing a gradually increasing restricted flow of fluid from said cylinder to the fluid chamber in response to the downward movement of its piston, means in the other cylinder for establishing a gradually decreasing restricted flow of fluid from said cylinder to the fluid chamber in response to the downward movement of its piston, and a common means for connecting the two cylinders when the pressure on the fluid in one cylinder is excessive.

4. A shock absorber comprising in combination, a casing presenting a fluid chamber and a pair of cylinders, a piston in each cylinder, means for operating said pistons, means in each piston for establishing a free flow of fluid from the fluid chamber into the respective cylinders in response to the upward movement of said pistons, means in the one cylinder for establishing a gradually increasing restricted flow of fluid from said cylinder to the fluid chamber in response to the downward movement of its piston, means in the other cylinder for establishing a gradually decreasing restricted flow of fluid from said cylinder to the fluid chamber in response to the downward movement of its piston, and a common relief valve for both cylinders adapted to relieve fluid pressures in either cylinder when the means for establishing the restricted flow of fluid from the respective cylinders is unable to relieve pressure conditions.

5. A shock absorber comprising in combination, a casing presenting a fluid chamber having two cylindrical portions, a piston in each cylindrical portion, each piston having two passages providing communication between the cylinder portions beneath the pistons and the fluid chamber above the pistons, means for closing one of said passages in each piston when the respective piston is moved in one direction, means adapted gradually to restrict the flow of fluid through the second passage in the one piston when said piston is moved in the other direction, means adapted initially to present a maximum restriction to the flow of fluid through the second passage of the other piston when said piston is moved in the other direction, said means, however, gradually decreasing said restriction to the fluid flow as the piston continues to move in said other direction, and means adapted to provide communication between the cylinders when the pressure upon the fluid in one cylinder is excessive.

6. A shock absorber comprising in combination, a casing presenting a fluid chamber having two cylindrical portions, a piston in each of said portions, means for operating said pistons, means in each piston for establishing a free flow of fluid from the fluid chamber into the respective cylindrical portions in response to the movement of the respective pistons in one direction, means comprising a stationary member and a movable member for establishing a gradually increasing restricted flow of fluid from one cylindrical portion and a gradually decreasing restricted flow of fluid from the other cylindrical portion to the fluid chamber in response to the movement of the respective pistons in the other direction, and means controlled solely by fluid pressure for providing communication between the two cylinders only when the fluid pressure in either one of the cylinders becomes excessive and regardless of the position of the pistons in their respective cylinders.

7. A shock absorber comprising in combination, a casing presenting a fluid chamber having two cylindrical portions, a piston in each of said portions, means for operating said pistons, an intake valve mechanism in each piston for establishing a free flow of fluid from the fluid chamber into the respective cylindrical portions in response to the movement of the respective pistons in one direction, means, comprising a part of the intake valve mechanism and a cooperating member supported by each cylindrical portion of the casing, for establishing a restricted flow of fluid from the respective cylindrical portions to the fluid chamber in response to the movement of the respective pistons in the other direction, and means controlled solely by fluid pressure for establishing communication between the cylinders when the pressure upon the fluid in either cylinder exceeds a certain value.

8. A shock absorber comprising in combination, a casing presenting a fluid reservoir and two cylinders, a piston in each cylinder forming a compression chamber therein, means for operating said pistons, a valve in each piston for establishing a free flow of fluid from the fluid reservoir into the cylinders in response to the movement of the respective pistons in one direction, means within each cylinder, adapted variably to restrict the flow of fluid from the cylinders to the fluid reservoir only in accordance with the positions of the respective pistons as they move in the other direction, a duct connecting the two compression chambers only, and a spring-loaded relief valve in the duct adapted to be operated solely by fluid pressure for providing communication only between the compression chambers of said cylinders in response to excessive pressure on the fluid in either cylinder and regardless of the position of the pistons in their respective cylinders.

9. A shock absorber comprising in combination, a casing presenting a fluid chamber and a pair of cylinders, a piston in each cylinder, means for operating said pistons, means for establishing a free flow of fluid from the fluid chamber into each cylinder in response to the movement of the respective pistons in one direction, means for establishing a restricted flow of fluid from each cylinder to the fluid chamber in response to the movement of the respective pistons in the other direction, and a relief valve normally shutting off communication between the cylinders, but operable by excessive pressure in either cylinder to establish communication between said cylinders, said relief valve comprising, a stationary core having a passage communicating with each cylinder respectively and a spring pressed valve member normally closing the end of said passages but operable by fluid pressure in said passages to provide a communicating channel between said passages.

10. A shock absorber comprising in combination, a casing presenting a fluid chamber and a pair of cylinders, a piston in each cylinder, means for operating said pistons, means for establishing a free flow of fluid from the fluid chamber into each cylinder in response to the movement of the respective pistons in one direction, means for establishing a restricted flow of fluid from each cylinder to the fluid chamber in response to the movement of the respective pistons in the other direction, and a relief valve normally shutting off communication between the cylinders but operable by excessive pressure in either cylinder to establish communication between said cylinders, said relief valve comprising, a core immovably supported in the casing, between the two cylinders, said core having longitudinal passages on opposite sides thereof, closed at one end, the other end extending to the end of the core, each passage communicating with a respective cylinder, a valve slidably supported in the casing and adapted to engage the end of the core to close the ends of the passages therein, a spring normally holding said valve in engagement with the core but permitting it to move away from the core and provide a space forming communication between the passages in the core in response to predetermined high fluid pressure in either cylinder.

11. An hydraulic shock absorber comprising, in combination, a casing providing a pair of cylinders each having a reciprocative piston forming a compression chamber therein, means for reciprocating said pistons; means adapted to establish a free flow of fluid from the reservoir into the compression chambers in response to the movement of the respective pistons in one direction; means adapted to provide a restricted flow of fluid from each compression chamber into the reservoir in response to the movement of the respective pistons in the other direction, said restriction varying in accordance with the position of the piston in its cylinder; a duct providing direct communication between said compression chambers only; and a valve normally closing said duct and adapted, at a predetermined fluid pressure in either cylinder, to establish a flow of fluid between said compression chambers only.

12. An hydraulic shock absorber comprising, in combination, a casing providing a fluid reservoir and two cylinders; a piston in each cylinder forming a compression chamber therein; means for reciprocating said pistons; means in each cylinder, adapted to establish a flow of fluid from the respective compression chamber into the reservoir in response to a certain movement of the piston forming said compression chamber, said means being adapted to restrict said flow in accordance with the position of the piston in its cylinder; and a valve duct connecting the two compression chambers for establishing direct flows of fluid therebetween in response to a predetermined fluid pressure.

13. An hydraulic shock absorber comprising, in combination, a casing providing a fluid reservoir and two cylinders; a piston in each cylinder forming a compression chamber therein; means for reciprocating said pistons; means in each cylinder, adapted to establish a flow of fluid from the respective compression chamber into the reservoir in response to a certain movement of the piston forming said compression chamber, one of said means being adapted increasingly to restrict its flow and the other decreasingly to restrict its flow as the respective piston moves in said certain direction; and a valved duct connecting said compression chamber for establishing restricted flows therebetween in response to a predetermined fluid pressure in either compression chamber.

In testimony whereof I hereto affix my signature.

WILLIAM A. CHRYST.